(12) United States Patent
Zhu

(10) Patent No.: US 12,528,433 B1
(45) Date of Patent: Jan. 20, 2026

(54) STARTING POWER SUPPLY DEVICE CAPABLE OF REVERSE CHARGING

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 19/076,399

(22) Filed: Mar. 11, 2025

(30) Foreign Application Priority Data

Jan. 24, 2025 (CN) .......................... 202520173854.3

(51) Int. Cl.
*B60R 16/033* (2006.01)
*H02J 7/00* (2006.01)

(52) U.S. Cl.
CPC .......... *B60R 16/033* (2013.01); *H02J 7/0048* (2020.01); *H02J 7/0068* (2013.01)

(58) Field of Classification Search
CPC .................................................. B60R 16/033
USPC ....................................................... 320/104
See application file for complete search history.

(56) References Cited

U.S. PATENT DOCUMENTS

| 2022/0037911 | A1* | 2/2022 | Ye .......................... H02J 7/0034 |
| 2022/0123581 | A1* | 4/2022 | Clarke .................. H02J 7/0069 |
| 2022/0376523 | A1* | 11/2022 | Brumley, Jr. ........... F02N 11/12 |
| 2024/0146086 | A1* | 5/2024 | Harish ............. H02J 7/007182 |

* cited by examiner

*Primary Examiner* — Yalkew Fantu
(74) *Attorney, Agent, or Firm* — Zhigang Ma

(57) ABSTRACT

A starting power supply device capable of reverse charging includes a main control module, a rechargeable battery connected to the main control module, and a battery level detection module connected to the main control module and the rechargeable battery. The battery level detection module is used for detecting a battery level of the rechargeable battery to generate a battery level signal, and sending the battery level signal to the main control module. The main control module is used for obtaining the battery level signal to determine the battery level of the rechargeable battery. Moreover, when the battery level of the rechargeable battery is lower than a preset battery level, the main control module is used for obtaining electrical energy from a car battery to charge the rechargeable battery reversely. By configuring the battery level detection module, the battery level of the rechargeable battery is detected in real time.

20 Claims, 11 Drawing Sheets

STARTING POWER SUPPLY DEVICE CAPABLE OF REVERSE CHARGING

CROSS-REFERENCE TO RELATED APPLICATIONS

The application claims priority of Chinese patent application CN2025201738543, filed on Jan. 24, 2025, which is incorporated herein by reference in its entireties.

TECHNICAL FIELD

The present invention relates to the technical field of power supplies, particularly to a starting power supply device capable of reverse charging.

BACKGROUND ART

A starting power supply device of a car is a multifunctional portable mobile power bank developed for users who travel by driving.

However, during actual use, users have found that traditional starting power supplies have the following problems: when the starting power supplies have insufficient battery level, a special external charging device needs to be used for charging, the charging method is inconvenient, and if it is in the suburbs, charging may even be impossible; after the starting power supplies are used for supporting multiple ignitions, the battery capacity may become insufficient, which can easily lead to deep discharge of the starting power supplies, and the starting power supplies may even be damaged if not charged in time; in low-temperature areas, due to the low temperature, the starting power supplies cannot support multiple ignitions; when not used for a long time, the starting power supplies themselves consume a significant amount of power; the starting power supply cannot be completely disconnected, and the like.

SUMMARY

In order to overcome the shortcomings of the prior art, a starting power supply device capable of reverse charging is provided in the present invention, which uses a car battery to charge a rechargeable battery when a battery level of the rechargeable battery is insufficient, so as to ensure that the battery level of the rechargeable battery is sufficient and protect the rechargeable battery.

A technical solution adopted by the present invention to solve its technical problem is as follows.

A starting power supply device capable of reverse charging is provided in the present invention, including a main control module, a rechargeable battery connected to the main control module, and a battery level detection module connected to the main control module and the rechargeable battery.

The battery level detection module is used for detecting a battery level of the rechargeable battery to generate a battery level signal, and sending the battery level signal to the main control module.

The main control module is used for obtaining the battery level signal to determine the battery level of the rechargeable battery. Moreover, when the battery level of the rechargeable battery is lower than a preset battery level, the main control module is used for obtaining electrical energy from a car battery to charge the rechargeable battery reversely.

Optionally, the rechargeable battery is electrically connected to the car battery through a bidirectional control module.

The bidirectional control module includes a magnetic latching relay, a forward control circuit connected to the main control module and the magnetic latching relay, and a reverse control circuit connected to the main control module and the magnetic latching relay.

The forward control circuit is used for receiving a forward control signal from the main control module, and controlling the magnetic latching relay to be closed based on the forward control signal.

The reverse control circuit is used for receiving a reverse control signal from the main control module, and controlling the magnetic latching relay to be disconnected based on the reverse control signal.

Optionally, the magnetic latching relay is a bidirectional magnetic latching relay.

Optionally, after a car is started, the battery level detection module detects a battery level of the rechargeable battery in real time, the bidirectional control module remains connected, and the main control module starts the car battery to reversely charge the rechargeable battery when the battery level of the rechargeable battery is lower than a preset battery level.

Optionally, the battery level detection module includes a detection triode, a first resistor, and a second resistor. The main control module is used for outputting a control signal to control the detection triode to be turned on. After the detection triode is turned on, a positive electrode of the rechargeable battery is voltage-divided through the first resistor and the second resistor. A voltage at one end of the detection triode is connected to a detection port of the main control module.

Optionally, the starting power supply device capable of reverse charging further includes a temperature detection module and/or a heating module connected to the main control module.

The temperature detection module is used for detecting a temperature of the rechargeable battery.

When the temperature of the rechargeable battery is lower than a preset temperature, the main control module starts the heating module to heat the rechargeable battery.

Optionally, when the temperature of the rechargeable battery reaches a first heating temperature, the main control module controls an output of the rechargeable battery to start a car.

Optionally, when the temperature of the rechargeable battery reaches a second heating temperature, the main control module controls the heating module to stop working.

Optionally, the temperature detection module includes an NTC sensor. The NTC sensor is in contact with the rechargeable battery and is used for detecting the temperature of the rechargeable battery.

Optionally, the heating module includes a heating sheet in contact with the rechargeable battery.

Optionally, the starting power supply device capable of reverse charging further includes a battery level display module connected to the main control module. The battery level display module is used for displaying the battery level of the rechargeable battery.

Optionally, the starting power supply device capable of reverse charging further includes a lighting module connected to the main control module. The lighting module is used for lighting.

Optionally, the starting power supply device capable of reverse charging further includes a charging module for charging the rechargeable battery.

Optionally, a battery protection module is connected between the charging module and the rechargeable battery.

Optionally, the starting power supply device capable of reverse charging further includes a housing and a circuit board. An accommodating cavity is formed inside the housing for the installation of the rechargeable battery and the circuit board. The main control module is integrated on the circuit board.

Optionally, the housing includes an upper housing and a lower housing. The accommodating cavity is formed inside the upper housing and the lower housing. The housing is equipped with a positive electrode charging clamp and a negative electrode charging clamp. A first end of the positive electrode charging clamp is connected to a positive electrode of the rechargeable battery, and a second end of the positive electrode charging clamp is used for connecting with a car battery. A first end of the negative electrode charging clamp is connected to a negative electrode of the rechargeable battery, and a second end of the negative electrode charging clamp is used for connecting with the car battery.

Optionally, the housing is provided with a positive electrode storage portion for accommodating the positive electrode charging clamp and a negative electrode storage portion for accommodating the negative electrode charging clamp.

Optionally, the upper housing is equipped with a battery level display structure. The battery level display structure includes a plurality of light emitting diodes connected to the main control module. The main control module controls the plurality of light emitting diodes to be powered on or off to display a battery level of the rechargeable battery.

Optionally, an inner wall of the lower housing is protruded with a plurality of partition members. The plurality of partition members are arranged at intervals to install a plurality of the rechargeable batteries.

Optionally, two adjacent partition members are connected with fixing members. The fixing member is arranged in an arc shape in a direction towards the rechargeable battery to adapt to the rechargeable battery.

Beneficial effects of the present invention are as follows. By configuring the battery level detection module, the battery level of the rechargeable battery is detected in real time. When the battery level of the rechargeable battery is lower than the preset battery level, the main control module controls the car battery to charge the rechargeable battery, so that the rechargeable battery is charged reversely, thereby ensuring that the battery level of the rechargeable battery is sufficient, effectively protecting the rechargeable battery, and avoiding damage of the battery caused by deep discharge. Furthermore, by configuring the temperature detection module, the temperature of the rechargeable battery can be detected in real time. When the temperature of the rechargeable battery is lower than the preset temperature, the main control module starts the heating module to heat the battery so as to maintain a high rate output of the rechargeable battery to start the car. Furthermore, by configuring the lighting module, lighting can be provided for the user outdoors or in places with poor visibility, which is convenient for the user.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
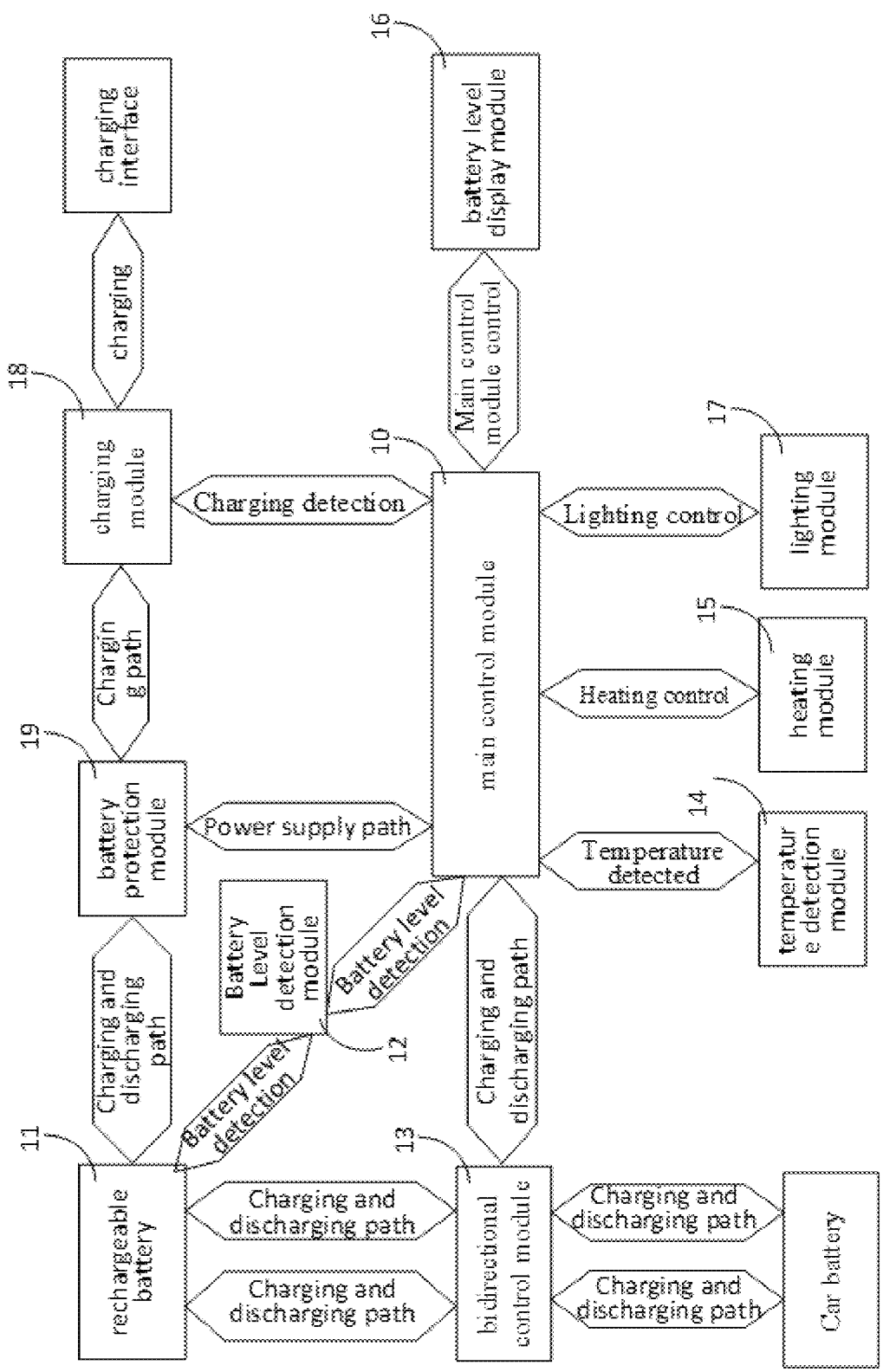
FIG. 1 is a working principle diagram of a starting power supply device according to an embodiment of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-11, a starting power supply device capable of reverse charging includes a main control module 10, a rechargeable battery 11 connected to the main control module 10, and a battery level detection module 12 connected to the main control module 10 and the rechargeable battery 11. The battery level detection module 12 is used for detecting a battery level of the rechargeable battery 11 to generate a battery level signal, and sending the battery level signal to the main control module 10. The main control module 10 is used for obtaining the battery level signal to determine the battery level of the rechargeable battery 11. Moreover, when the battery level of the rechargeable battery 11 is lower than a preset battery level, the main control module 10 is used for obtaining electrical energy from a car battery to charge the rechargeable battery 11 reversely.

In this embodiment, the starting power supply device is an emergency auxiliary power supply when the car battery cannot be started, and is capable of charging the car battery. By configuring the battery level detection module 12, the battery level of the rechargeable battery 11 is detected in real time. When the battery level of the rechargeable battery 11 is lower than the preset battery level, the main control module 10 controls the car battery to charge the rechargeable battery 11 reversely in a timely manner, so that the battery level of the rechargeable battery 11 is sufficient, the rechargeable battery 11 can be effectively protected, the situation that the rechargeable battery 11 is damaged caused by deep discharge is avoided, and the problem that the rechargeable battery needs to be charged by an external charging device after the existing rechargeable battery 11 supports multiple ignitions is solved. In this embodiment, the rechargeable battery 11 is a lithium battery, and a plurality of lithium batteries are connected to achieve better energy storage and energy supply.

Figure 2:
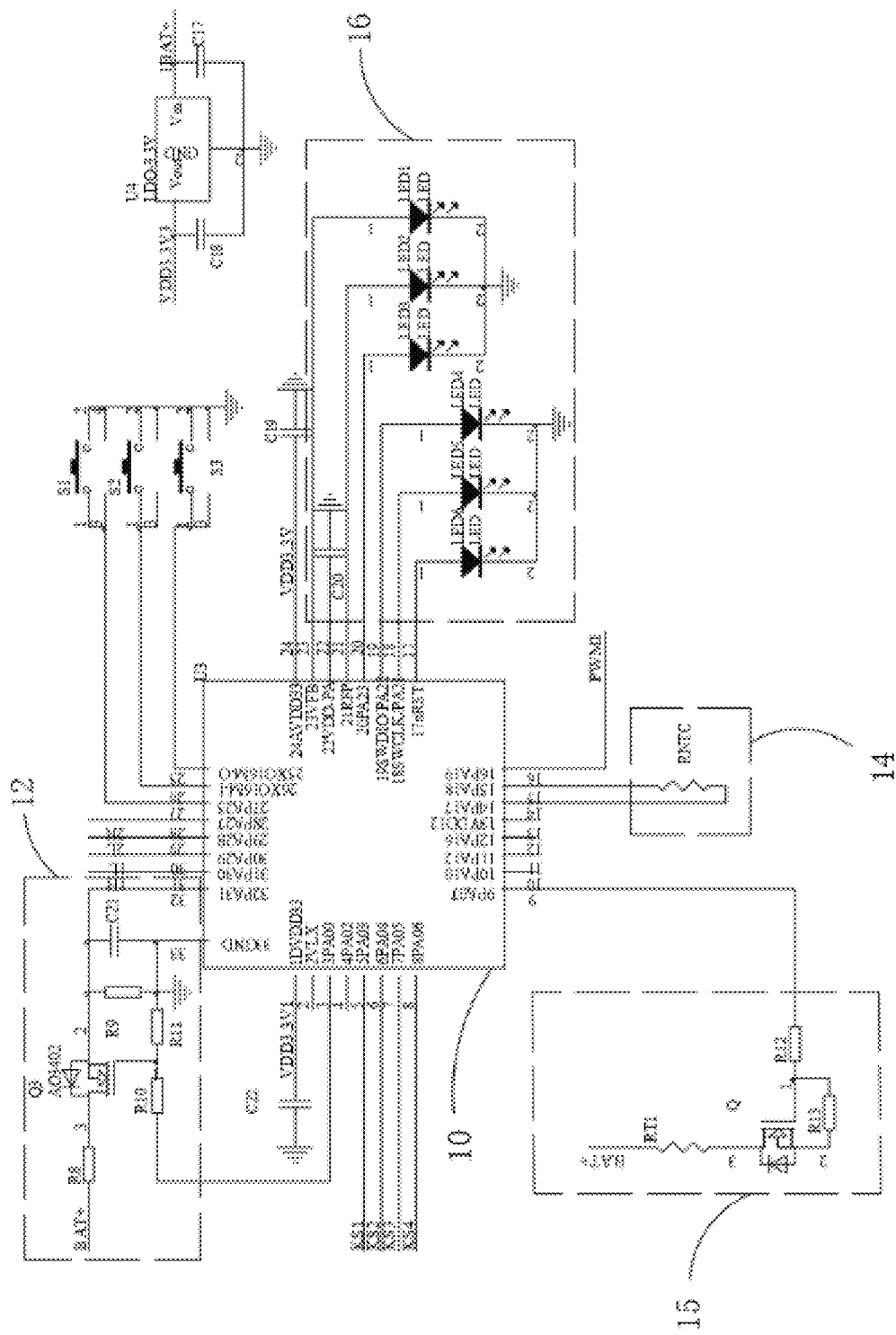
FIG. 2 is a working circuit diagram of a main control module, a battery level detection module, a temperature detection module, a heating module, and a battery level display module according to an embodiment of the present invention.

In one embodiment, as shown in FIG. 1 and FIG. 2, the battery level detection module 12 includes a detection triode Q3, a first resistor R8, a second resistor R9, and a first capacitor C21. The main control module 10 outputs a control signal to control the detection triode Q3 to be turned on. A positive electrode of the rechargeable battery 11 is voltage-divided through the first resistor R8 and the second resistor R9. One end of the detection triode Q3 (i.e., a second end of the detection triode Q3 in FIG. 3) is used as a voltage division point, and a voltage of the voltage division point is filtered by the first capacitor C21 and then connected to a detection port of the main control module 10. With the change of a voltage of the rechargeable battery, the voltage of the voltage division point also changes, thereby achieving the detection of the battery level of the rechargeable battery 11. By configuring the first capacitor C21 to filter the voltage of the voltage division point, noise is reduced, and it is ensured that the accuracy of the detected battery level of the rechargeable battery is high.

Figure 3:
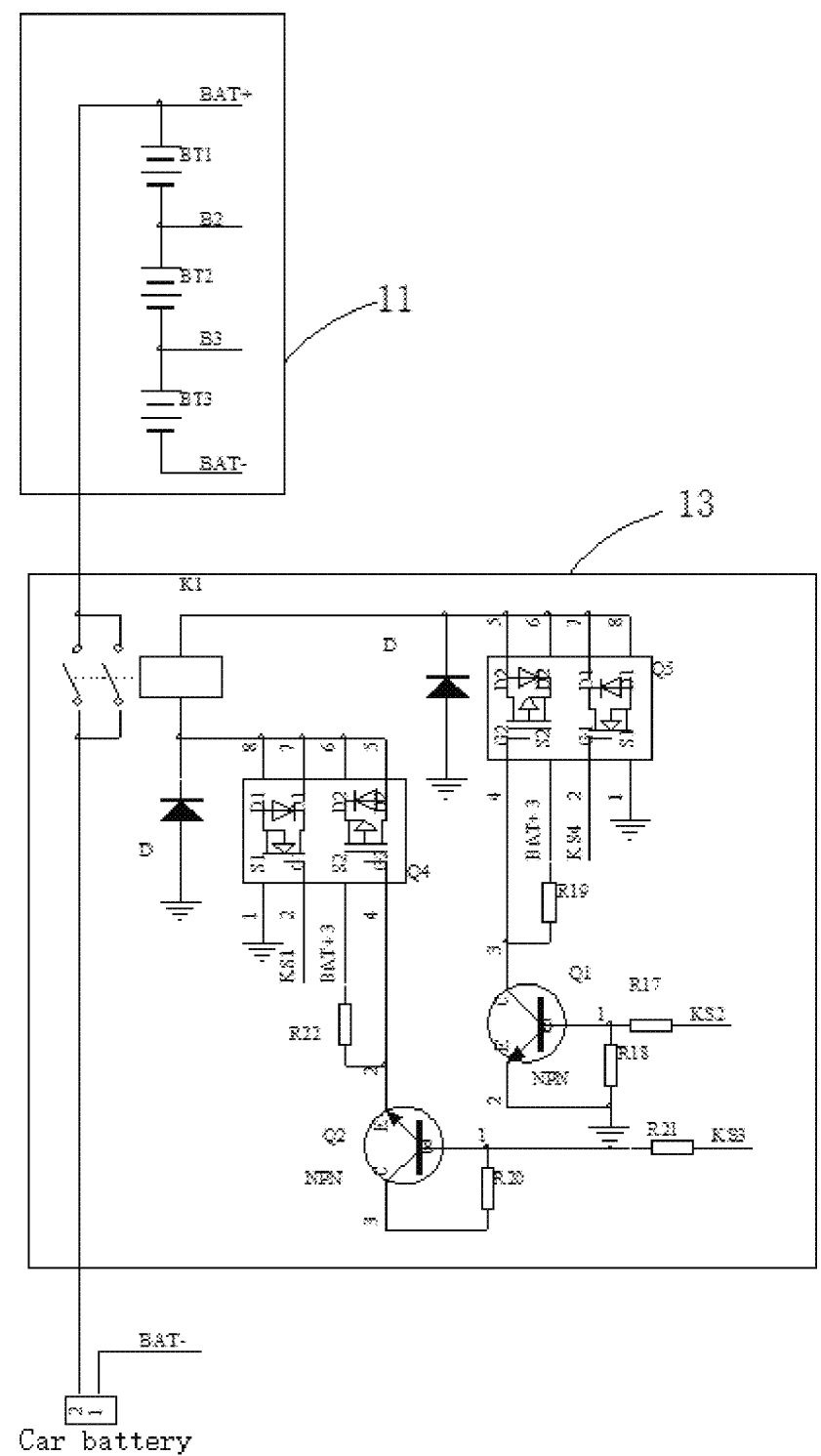
FIG. 3 is a working circuit diagram of a rechargeable battery and a bidirectional control module according to an embodiment of the present invention.

In one embodiment, as shown in FIGS. 1-3, the rechargeable battery 11 is electrically connected to the car battery through a bidirectional control module 13. The bidirectional control module 13 includes a magnetic latching relay K1, a forward control circuit connected to the main control module 10 and the magnetic latching relay K1, and a reverse control circuit connected to the main control module and the magnetic latching relay K1. The forward control circuit is used for receiving a forward control signal from the main control module 10, and controlling the magnetic latching relay K1 to be closed based on the forward control signal. The reverse control circuit is used for receiving a reverse control signal from the main control module 10, and controlling the magnetic latching relay K1 to be disconnected based on the reverse control signal. In this embodiment, by configuring the forward control circuit, the magnetic latching relay is controlled to be closed, and by configuring the reverse control circuit, the magnetic latching relay is controlled to be disconnected, so that the problem that the output of the rechargeable battery cannot be completely disconnected is solved. The magnetic latching relay K1 does not need to be continuously powered to maintain a working state, which can significantly reduce the waste of electric energy. Moreover, since a contact state of the magnetic latching relay K1 is maintained by a magnetic force generated by a permanent magnet, the current state can be maintained even after interruption of power supply, without the need for continuous power supply, which can effectively improve stability. In one embodiment, the magnetic latching relay K1 is a bidirectional magnetic latching relay.

Specifically, as shown in FIG. 3, the forward control circuit includes a forward triode Q1, a first forward MOSFET Q5 (G2S2D2), and a second forward MOSFET Q4 (G1S1D1). The forward triode Q1 performs secondary control, so that the main control module 10 controls the first forward MOSFET Q5 (G2S2D2) and the second forward MOSFET Q4 (G1S1D1) to be turned on. The main control module 10 outputs a KS1 effective signal and a KS2 effective signal as the forward control signal to control the magnetic latching relay K1 to be closed.

The reverse control circuit includes a reverse triode Q2, a first reverse MOSFET Q4 (G2S2D2), and a second reverse MOSFET Q5 (G1S1D1). The reverse triode Q2 performs secondary control, so that the main control module 10 controls the first reverse MOSFET Q4 (G2S2D2) and the second reverse MOSFET Q5 (G1S1D1) to be turned on. The main control module 10 outputs a KS3 effective signal and a KS4 effective signal as the reverse control signal to control the magnetic latching relay K1 to be disconnected.

It should be noted that forward and reverse are only used to describe the direction of signal transmission and are not limited. Therefore, the KS1 effective signal and the KS2 effective signal can be used as the reverse control signal, and at this time, the KS3 effective signal and the KS4 effective signal are used as the forward control signal.

In this embodiment, the bidirectional control module 13 is connected between the car battery and the rechargeable battery 11. After a car is started, the battery level detection module 12 detects a battery level of the rechargeable battery 11 in real time, the bidirectional control module 13 remains connected, and the main control module 10 obtains electrical energy from the car battery to charge the rechargeable battery 11 reversely when the battery level of the rechargeable battery 11 is lower than the preset battery level.

In this embodiment, after a car is started, even if the power supply is not continued, the bidirectional control module 13 continuously remains connected. When the battery level of the rechargeable battery 11 is low, the main control module 10 promptly controls the car battery to charge the rechargeable battery 11.

As shown in FIG. 2, the starting power supply device capable of reverse charging further includes a temperature detection module 14 and/or a heating module 15 connected to the main control module 10. The temperature detection module 14 is used for detecting a temperature of the rechargeable battery 11. The heating module 15 is in contact with the rechargeable battery 11. When the temperature of the rechargeable battery 11 is lower than a preset temperature, the main control module 10 starts the heating module 15 to heat the rechargeable battery 11. Specifically, a working circuit diagram of the temperature detection module 14 and the heating module 15 is shown in FIG. 2. The temperature detection module 14 includes an NTC sensor. The NTC sensor is in contact with the rechargeable battery 11 and is used for accurately detecting the temperature of the rechargeable battery 11. The heating module 15 includes a heating sheet in contact with the rechargeable battery 11. In other embodiments, the heating module 15 includes an electric heating wire, an electric heating film, a thermocouple, and the like, which are not limited here. Normally, in a low-temperature environment, due to the low temperature, the rechargeable battery 11 cannot support multiple ignitions, resulting in very low output efficiency. In this embodiment, the temperature of the rechargeable battery 11 is detected in real time, realizing the automatic heating of the rechargeable battery 11 in the low-temperature environment, ensuring the rechargeable battery 11 remains at an appropriate temperature, and achieving a high rate output of the rechargeable battery 11 to start the car, so that in the low-temperature environment, the rechargeable battery 11 can still support multiple ignitions.

Specifically, when the temperature of the rechargeable battery 11 is lower than the preset temperature, the main control module 10 controls the heating module 15 to heat. When the temperature of the rechargeable battery 11 reaches a first heating temperature, the main control module 10 obtains electrical energy from the car battery to charge the rechargeable battery 11 reversely. When the temperature of the rechargeable battery 11 reaches a second heating temperature, the main control module 10 controls the heating module 15 to stop working. By setting the first heating temperature, a guarantee is provided for the high rate output of the rechargeable battery 11, and by setting the second heating temperature, the heating module 15 can automatically stop heating, thereby preventing excessive temperatures from damaging the rechargeable battery 11. It should be noted that the preset temperature, the first heating temperature, and the second heating temperature can be set according to an actual situation, as long as the preset temperature is lower than the first heating temperature and the first heating temperature is lower than the second heating temperature. As an example, the preset temperature is 5 degrees Celsius, the first heating temperature is 12 degrees Celsius, and the second heating temperature is 20 degrees Celsius.

As shown in FIG. 2, the starting power supply device capable of reverse charging further includes a battery level display module 16 connected to the main control module 10. The battery level display module 16 is used for displaying the battery level of the rechargeable battery 11. In this embodiment, by configuring the battery level display module 16, a user can intuitively understand a remaining battery level of the rechargeable battery 11. In other ways, the remaining battery level of the rechargeable battery 11 can also be broadcast by setting a sound.

Figure 4:
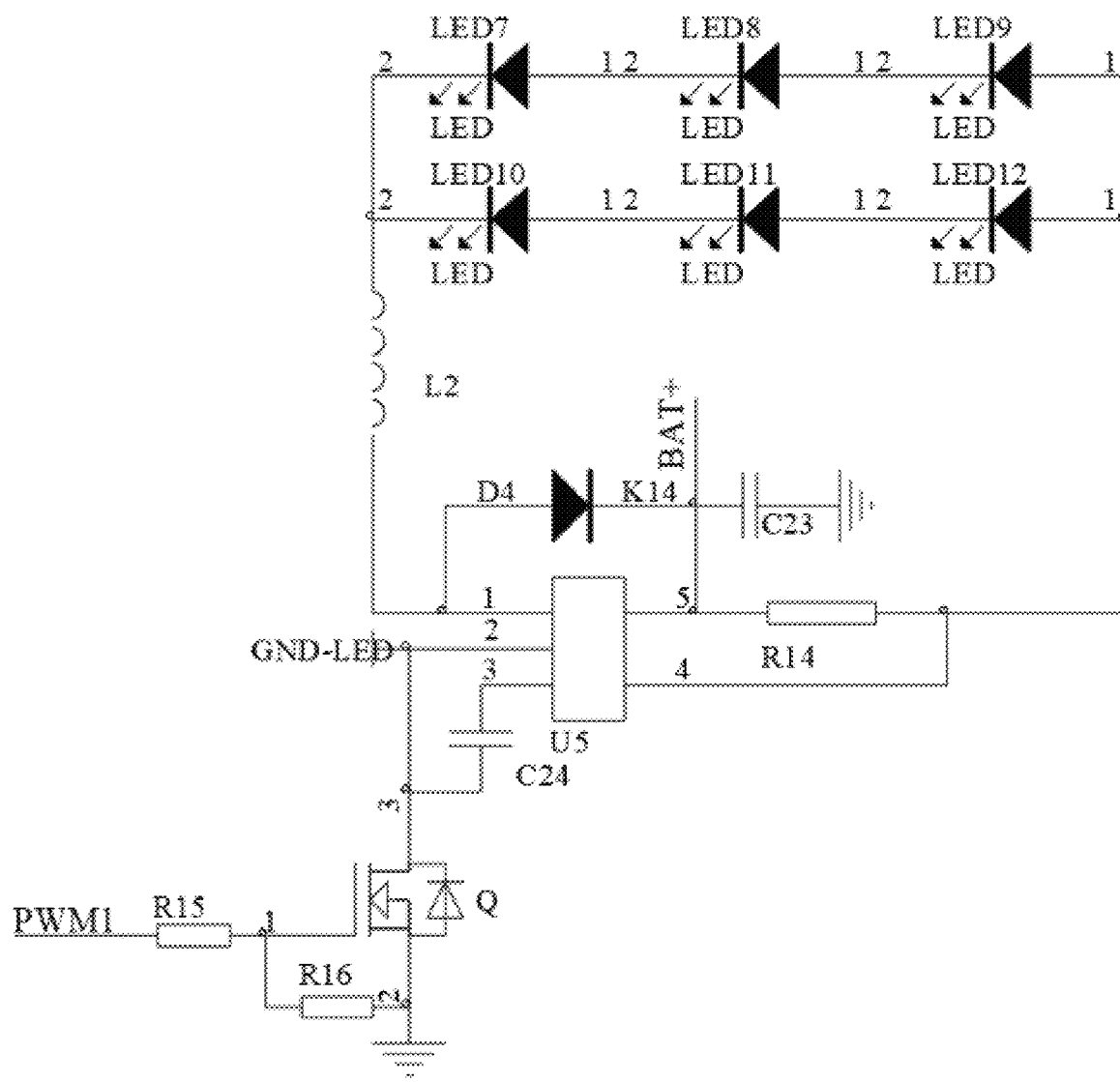
FIG. 4 is a working circuit diagram of a lighting module according to an embodiment of the present invention.

As shown in FIG. 4, the starting power supply device capable of reverse charging further includes a lighting module 17 connected to the main control module 10. The lighting module 17 is used for lighting. In this embodiment, by configuring the lighting module 17, the user can be provided with convenient lighting outdoors and in places with poor visibility, such as enabling the user to perform an operation of connecting power lines in a clearly lit environment.

Figure 5:
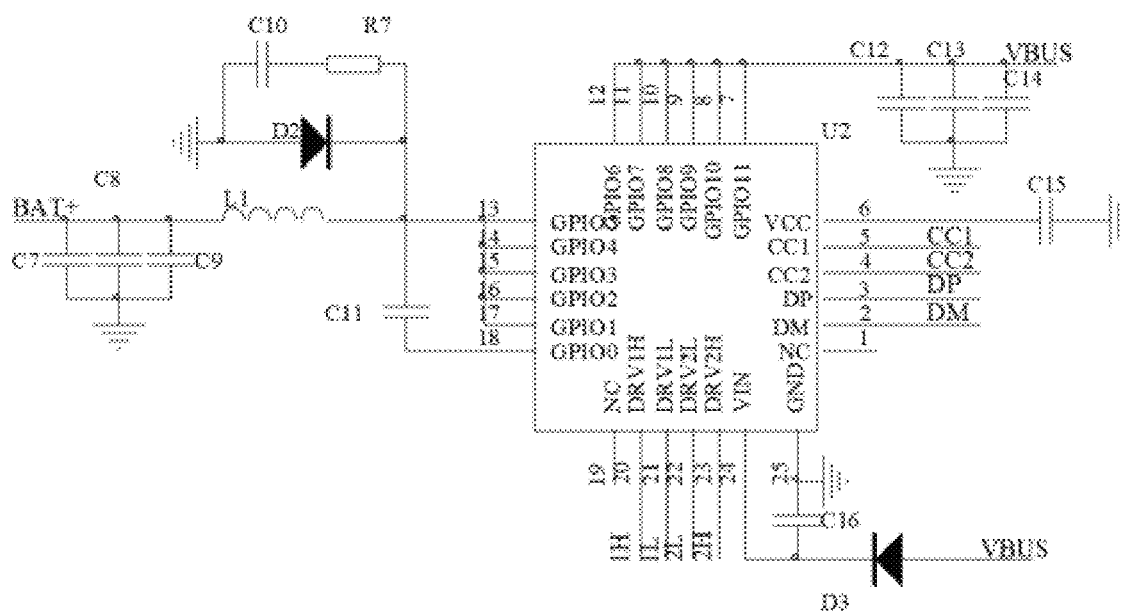
FIG. 5 is a working circuit diagram of a charging module according to an embodiment of the present invention.

As shown in FIG. 5, the starting power supply device capable of reverse charging further includes a charging module 18 for charging the rechargeable battery 11 reversely. In this embodiment, the charging module 18 is equipped with a USB charging interface. Through the USB charging interface, the rechargeable battery 11 is reversely charged.

Figure 6:
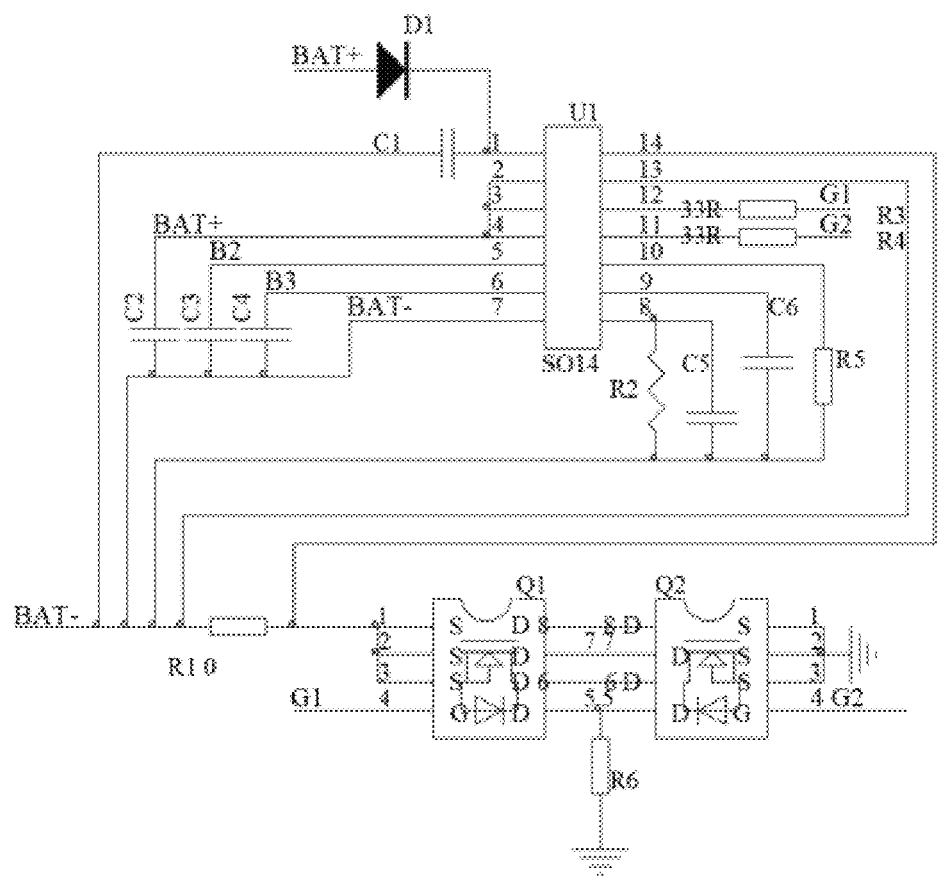
FIG. 6 is a working circuit diagram of a battery protection module according to an embodiment of the present invention.

As shown in FIG. 6, the starting power supply device capable of reverse charging is provided with a battery protection module 19 connected between the charging module 18 and the rechargeable battery 11. In this embodiment, the battery protection module 19 is equipped with a current protection function to protect the rechargeable battery 11.

Figure 7:
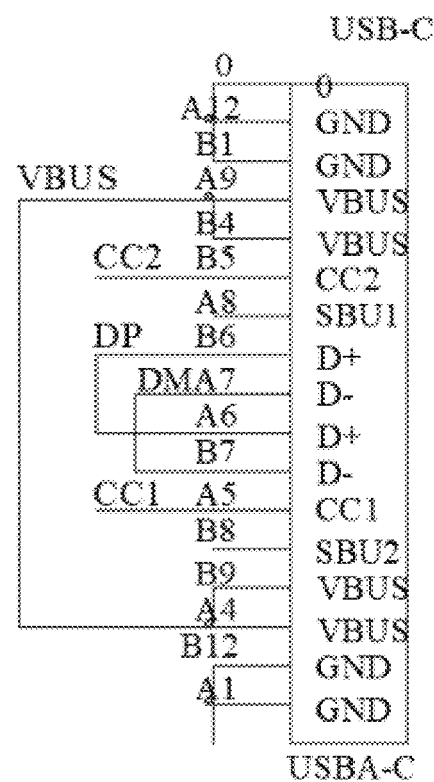
FIG. 7 is a working circuit diagram of a charging interface according to an embodiment of the present invention.
Figure 8:
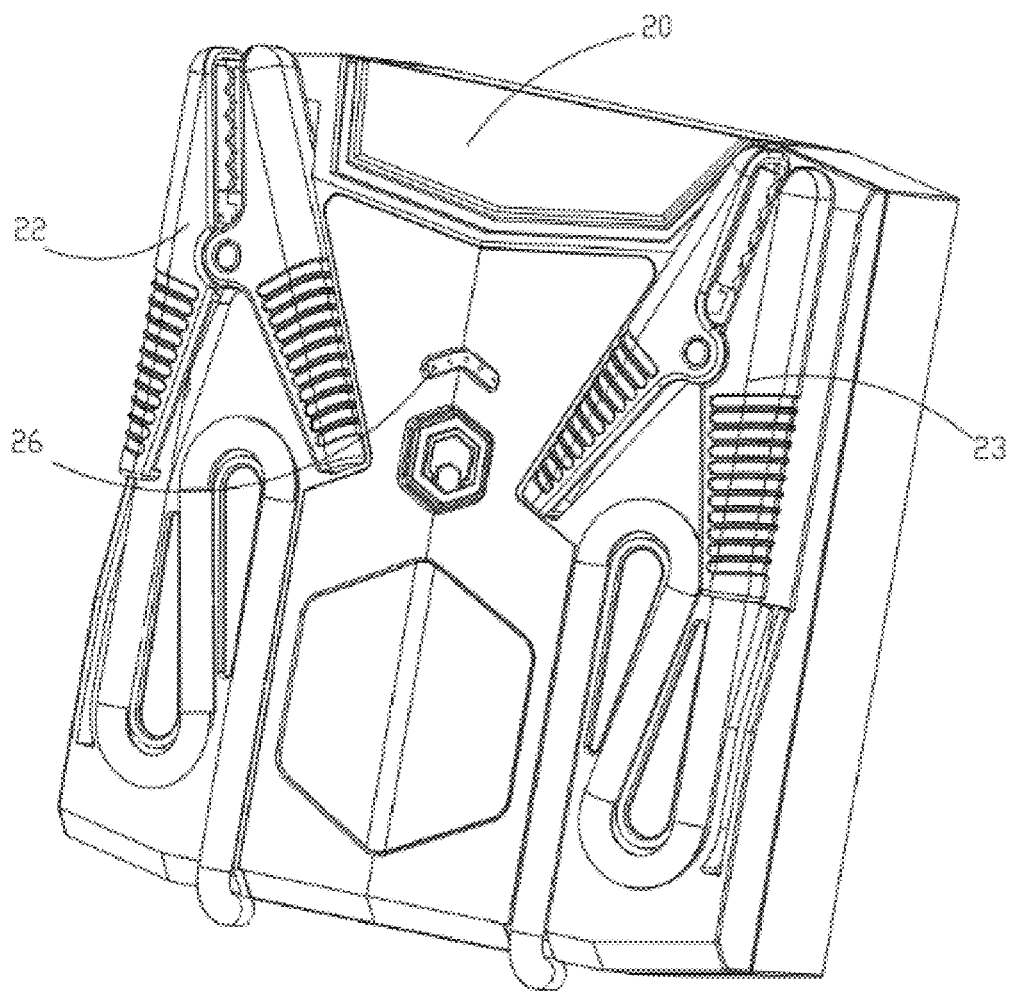
FIG. 8 is a schematic structural diagram of a starting power supply device according to an embodiment of the present invention.
Figure 10:
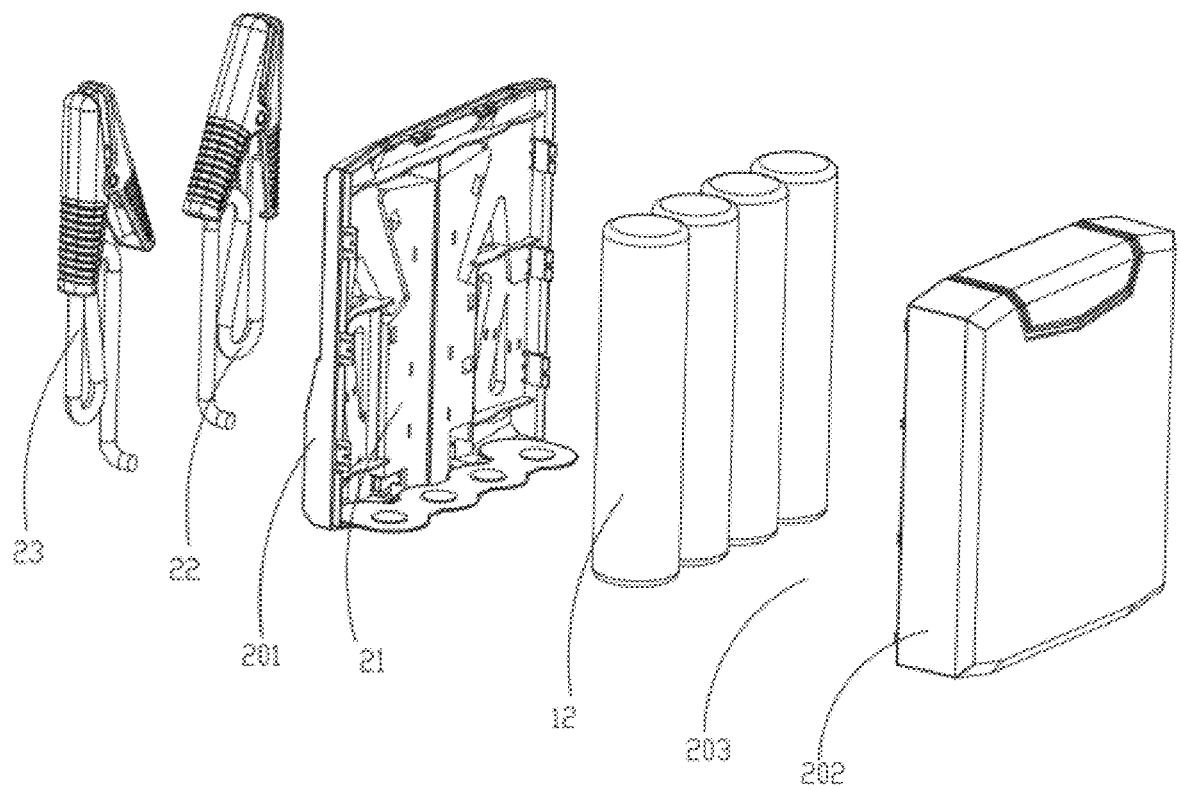
FIG. 10 is a schematic diagram of disassembly of a starting power supply device in another direction according to an embodiment of the present invention.

In one embodiment, as shown in FIG. 7 and FIG. 10, the starting power supply device capable of reverse charging further includes a housing 20 and a circuit board 21. An accommodating cavity 203 is formed inside the housing 20 for the installation of the rechargeable battery 11 and the circuit board 21. The main control module 10 is integrated on the circuit board 21. In this embodiment, the main control module 10, the battery level detection module 12, the bidirectional control module 13, the temperature detection module 14, the heating module 15, the battery level display module 16, the lighting module 17, the charging module 18, and the battery protection module 19 are all integrated on the circuit board 21. In this embodiment, the circuit board 21 is integrated with a main control chip, a lighting chip, a battery protection chip, and a charging chip. The main control module 10, the battery level detection module 12, the bidirectional control module 13, the temperature detection module 14, the heating module 15, and the battery level display module 16 are all packaged on the main control chip. The lighting module 17 is packaged on the lighting chip, the charging module 18 is packaged on the charging chip, and the battery protection module 19 is packaged on the battery protection chip, so that the efficient operation of each module is ensured. The main control chip adopts a technology of low power consumption, which can maintain longer standby time of a starting battery. Specifically, the power consumption of the main control chip is less than 50 milliwatts.

Figure 9:
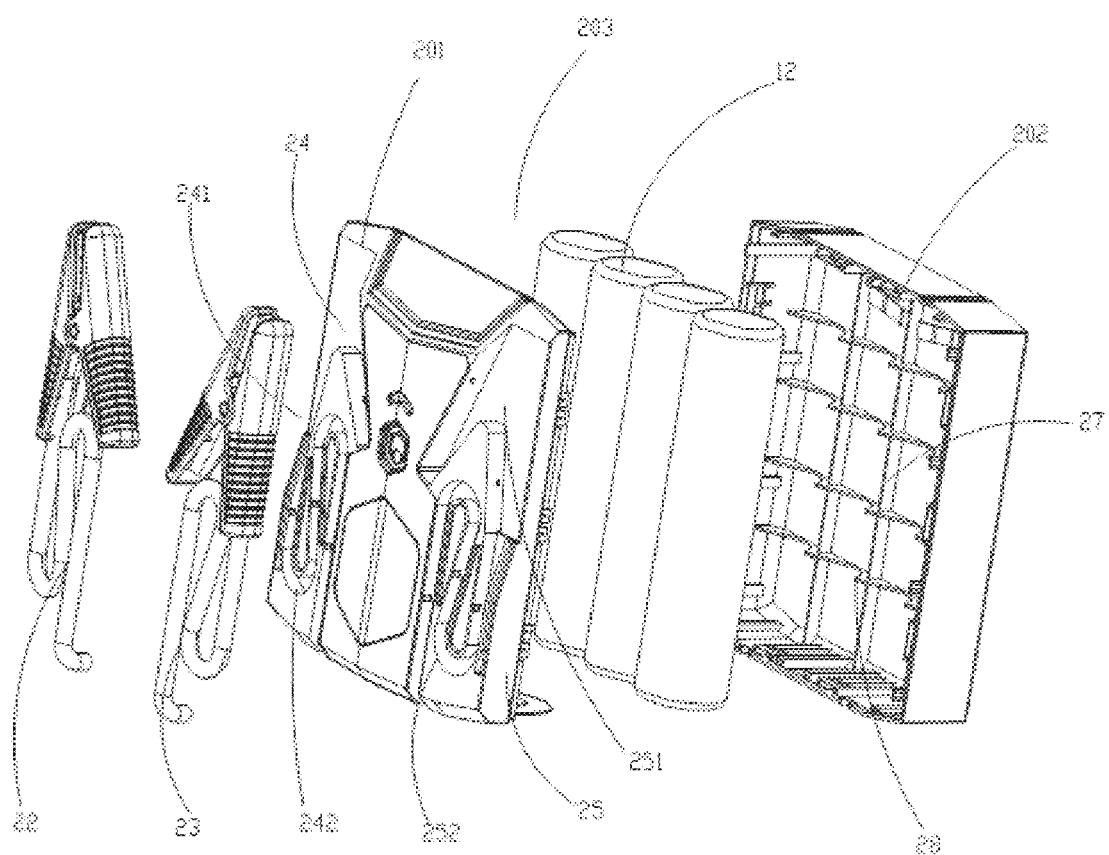
FIG. 9 is a schematic diagram of disassembly of a starting power supply device in one direction according to an embodiment of the present invention.
Figure 11:
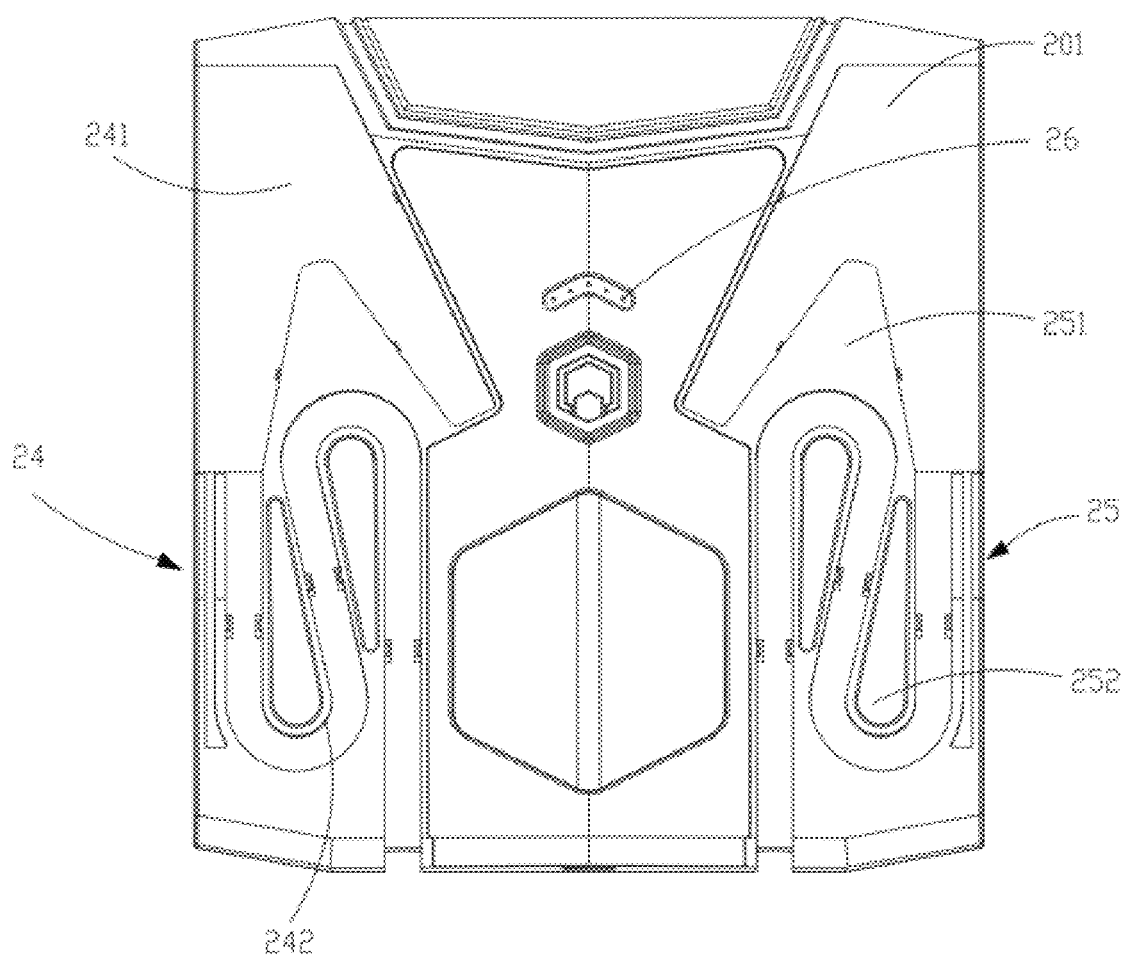
FIG. 11 is a schematic structural diagram of an upper housing, a battery level display structure, a positive electrode storage portion, and a negative electrode storage portion of a starting power supply device according to an embodiment of the present invention.

In one embodiment, as shown in FIGS. 9-11, the housing 20 includes an upper housing 201 and a lower housing 202 that are adapted to each other. The accommodating cavity 203 is formed inside the upper housing 201 and the lower housing 202. The housing 20 is equipped with a positive electrode charging clamp 22 and a negative electrode charging clamp 23. A first end of the positive electrode charging clamp 22 is connected to a positive electrode of the rechargeable battery 11, and a second end of the positive electrode charging clamp 22 is used for connecting with the car battery. A first end of the negative electrode charging clamp 23 is connected to a negative electrode of the rechargeable battery 11, and a second end of the negative electrode charging clamp 23 is used for connecting with the car battery.

The housing 20 is provided with a positive electrode storage portion 24 for accommodating the positive electrode charging clamp 22 and a negative electrode storage portion 25 for accommodating the negative electrode charging clamp 23. By configuring the positive electrode storage section 24 and the negative electrode storage section 25 to respectively store the positive electrode charging clamp 22 and the negative electrode charging clamp 23, it is ensured that the positive electrode charging clamp 22 and the negative electrode charging clamp 23 are better stored, which can protect the positive electrode charging clamp 22 and the negative electrode charging clamp 23 from damage.

In one embodiment, as shown in FIGS. 9-11, the positive electrode storage portion 24 includes a positive electrode concave groove 241 and a positive electrode wire groove 242 formed on an outer surface of the upper housing 201. The positive electrode concave groove 241 is in communication with the positive electrode wire groove 242 for the placement of the positive electrode charging clamp 22. The negative electrode storage portion 25 includes a negative electrode concave groove 251 and a negative electrode wire groove 252 formed on an outer surface of the upper housing 201. The negative electrode concave groove 251 is in communication with the negative electrode wire groove 252 for the placement of the negative electrode charging clamp 23. In this embodiment, the positive electrode charging clamp 22 includes a positive electrode clamp and a positive electrode connecting wire. The positive electrode clamp is installed in the positive electrode concave groove 241. The positive electrode concave groove 241 is adapted to a shape of the positive electrode clamp. The positive electrode connecting wire is installed in the positive electrode wire groove 242, and the positive electrode wire groove 242 is adapted to a shape of the positive electrode connecting wire, so as to ensure better storage effect and protect the positive electrode charging clamp 22. Similarly, the negative electrode charging clamp 23 includes a negative electrode clamp and a negative electrode connecting wire. The negative electrode clamp is installed in the negative electrode concave groove 251, and the negative electrode concave groove 251 is adapted to a shape of the negative electrode clamp. The negative electrode connecting wire is installed in the negative electrode wire groove 252. The negative electrode wire groove 252 is adapted to a shape of the negative electrode connecting wire, so as to ensure better storage effect and protect the negative electrode charging clamp 23.

The upper housing 201 is equipped with a battery level display structure 26. The battery level display structure 26 includes a plurality of light emitting diodes connected to the main control module 10. The main control module 10 controls one or more of the light emitting diodes to be powered on or off to display the battery level of the rechargeable battery 11. In this embodiment, by configuring the plurality of light emitting diodes, the main control module 10 learns the remaining battery level of the rechargeable battery 11 based on the battery level detection module 12, and controls a light emitting diode corresponding to the remaining battery level to light up, so that the user can intuitively understand the remaining battery level of the rechargeable battery 11. It can be understood that other methods can also be used to display the remaining battery level of the rechargeable battery 11, such as using voice broadcasting to remind the user of the remaining battery level of the rechargeable battery 11, or using an interface to display the remaining battery level of the rechargeable battery 11, which is not limited here.

An inner wall of the lower housing 202 is protruded with a plurality of partition members 27. The plurality of partition members 27 are arranged at intervals to install a plurality of the rechargeable batteries 11. In this embodiment, by arranging the partition members 27, the plurality of rechargeable batteries 11 are separated, so as to better protect the rechargeable batteries 11 and avoid the plurality of rechargeable batteries 11 from being squeezed against each other.

Two adjacent partition members 27 are connected with fixing members 28. The fixing member 28 is arranged in an arc shape in a direction towards the rechargeable battery 11 to adapt to the rechargeable battery 11. Two adjacent partition members 27 are connected with a plurality of fixing members 28, so that the rechargeable battery 11 is stably installed on the fixing members 28 to ensure that the rechargeable battery 11 is stably installed on the housing 20.

A working process of the starting power supply device capable of reverse charging of the present invention is as follows: when the car is started, the bidirectional control module 13 is connected, and the rechargeable battery 11 provides electrical energy to the car. After starting, the bidirectional control module 13 remains connected continuously, the main control module 10 is used for outputting a control signal to control the detection triode of the battery level detection module 12 to be turned on, the positive pole of the rechargeable battery 11 is voltage-divided through the first resistor and the second resistor, one end of the detection triode serves as a voltage division point, the voltage of the voltage division point is filtered by the first capacitor and then connected to a detection port of the main control module 10, and as the battery voltage changes, the voltage of the voltage division point also changes, thereby achieving battery level detection of the rechargeable battery 11. When the battery level of the rechargeable battery 11 is lower than the preset battery level, the main control module 10 controls the car battery to charge the rechargeable battery 11, thereby achieving reverse charging of the rechargeable battery 11 to effectively protect the rechargeable battery from damage caused by deep discharge. Furthermore, by configuring the temperature detection module 14, the temperature of the rechargeable battery 11 can be detected in real time. When the temperature of the rechargeable battery 11 is lower than the preset temperature, the main control module 10 starts the heating module 15 to heat the battery. When the temperature of the rechargeable battery 11 reaches the first heating temperature, the main control module 10 obtains electrical energy from the car battery to charge the rechargeable battery 11 reversely. When the temperature of the rechargeable battery 11 reaches the second heating temperature, the main control module 10 controls the heating module 15 to stop working. By setting the first heating temperature, the rechargeable battery 11 can be automatically heated, thereby providing a guarantee for the high rate output of the rechargeable battery 11. Furthermore, by configuring the battery level display module 16, the user can intuitively understand the remaining battery level of the rechargeable battery 11. Furthermore, by configuring the lighting module 17, the user can be provided with lighting outdoors or in places with poor visibility, making it convenient for the user to perform other operations.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A starting power supply device capable of reverse charging, comprising:

a main control module;
a rechargeable battery connected to the main control module; and
a battery level detection module connected to the main control module and the rechargeable battery;
wherein the battery level detection module is used for detecting a battery level of the rechargeable battery to generate a battery level signal, and sending the battery level signal to the main control module;
the main control module is used for obtaining the battery level signal to determine the battery level of the rechargeable battery, and when the battery level of the rechargeable battery is lower than a preset battery level, obtaining electrical energy from a car battery to charge the rechargeable battery reversely;
wherein the rechargeable battery is electrically connected to the car battery through a bidirectional control module;
the bidirectional control module comprises a magnetic latching relay, a forward control circuit connected to the main control module and the magnetic latching relay, and a reverse control circuit connected to the main control module and the magnetic latching relay;
the forward control circuit is used for receiving a forward control signal from the main control module, and controlling the magnetic latching relay to be closed based on the forward control signal;
the reverse control circuit is used for receiving a reverse control signal from the main control module, and controlling the magnetic latching relay to be disconnected based on the reverse control signal.

2. The starting power supply device capable of reverse charging according to claim 1, wherein the magnetic latching relay is a bidirectional magnetic latching relay.

3. The starting power supply device capable of reverse charging according to claim 1, wherein after a car is started, the battery level detection module detects a battery level of the rechargeable battery in real time, the bidirectional control module remains connected, and the main control module starts the car battery to reversely charge the rechargeable battery when the battery level of the rechargeable battery is lower than a preset battery level.

4. The starting power supply device capable of reverse charging according to claim 1, wherein the battery level detection module comprises a detection triode, a first resistor, and a second resistor; the main control module is used for outputting a control signal to control the detection triode to be turned on; after the detection triode is turned on, a positive electrode of the rechargeable battery is voltage-divided through the first resistor and the second resistor, and a voltage at one end of the detection triode is connected to a detection port of the main control module.

5. The starting power supply device capable of reverse charging according to claim 1, further comprising a temperature detection module—and a heating module connected to the main control module;
wherein the temperature detection module is used for detecting a temperature of the rechargeable battery;
when the temperature of the rechargeable battery is lower than a preset temperature, the main control module starts the heating module to heat the rechargeable battery.

6. The starting power supply device capable of reverse charging according to claim 5, wherein when the temperature of the rechargeable battery reaches a first heating temperature, the main control module controls an output of the rechargeable battery to start a car.

7. The starting power supply device capable of reverse charging according to claim 6, wherein when the temperature of the rechargeable battery reaches a second heating temperature, the main control module controls the heating module to stop working.

8. The starting power supply device capable of reverse charging according to claim 5, wherein the temperature detection module comprises an NTC sensor, the NTC sensor is in contact with the rechargeable battery and is used for detecting the temperature of the rechargeable battery.

9. The starting power supply device capable of reverse charging according to claim 5, wherein the heating module comprises a heating sheet in contact with the rechargeable battery.

10. The starting power supply device capable of reverse charging according to claim 1, further comprising a battery level display module connected to the main control module, wherein the battery level display module is used for displaying the battery level of the rechargeable battery.

11. The starting power supply device capable of reverse charging according to claim 1, further comprising a lighting module connected to the main control module, wherein the lighting module is used for lighting.

12. The starting power supply device capable of reverse charging according to claim 1, further comprising a charging module for charging the rechargeable battery.

13. The starting power supply device capable of reverse charging according to claim 12, wherein a battery protection module is connected between the charging module and the rechargeable battery.

14. The starting power supply device capable of reverse charging according to claim 1, further comprising a housing and a circuit board, wherein an accommodating cavity is formed inside the housing for the installation of the rechargeable battery and the circuit board, and the main control module is integrated on the circuit board.

15. The starting power supply device capable of reverse charging according to claim 14, wherein the housing comprises an upper housing and a lower housing, and the accommodating cavity is formed inside the upper housing and the lower housing; the housing is equipped with a positive electrode charging clamp and a negative electrode charging clamp; a first end of the positive electrode charging clamp is connected to a positive electrode of the rechargeable battery, and a second end of the positive electrode charging clamp is used for connecting with a car battery; a first end of the negative electrode charging clamp is connected to a negative electrode of the rechargeable battery, and a second end of the negative electrode charging clamp is used for connecting with the car battery.

16. The starting power supply device capable of reverse charging according to claim 15, wherein the housing is provided with a positive electrode storage portion for accommodating the positive electrode charging clamp and a negative electrode storage portion for accommodating the negative electrode charging clamp.

17. The starting power supply device capable of reverse charging according to claim 15, wherein the upper housing is equipped with a battery level display structure, the battery level display structure comprises a plurality of light emitting diodes connected to the main control module, and the main control module controls one or more of the plurality of light emitting diodes to be powered on or off to display a battery level of the rechargeable battery.

18. The starting power supply device capable of reverse charging according to claim 15, wherein an inner wall of the lower housing is protruded with a plurality of partition members, and the plurality of partition members are arranged at intervals to install a plurality of the rechargeable batteries.

19. The starting power supply device capable of reverse charging according to claim 18, wherein two adjacent partition members are connected with fixing members, and the fixing member is arranged in an arc shape in a direction towards the rechargeable battery to adapt to the rechargeable battery.

20. The starting power supply device capable of reverse charging according to claim 4, wherein:
the forward control circuit includes a forward triode Q1, a first forward MOSFET Q5 (G2S2D2), and a second forward MOSFET Q4 (G1S1D1), the main control module is configured to have the forward triode Q1 to be conductive to control the first forward MOSFET Q5 (G2S2D2) and the second forward MOSFET Q4 (G1S1D1) to be turned on to control the magnetic latching relay K1 to be closed; and
the reverse control circuit includes a reverse triode Q2, a first reverse MOSFET Q4 (G2S2D2), and a second reverse MOSFET Q5 (G1S1D1), the main control module is configured to control the reverse triode Q2 to be conductive to control the first reverse MOSFET Q4 (G2S2D2) and the second reverse MOSFET Q5 (G1S1D1) to be turned on to control the magnetic latching relay K1 to be disconnected.

* * * * *